United States Patent
Lee et al.

(10) Patent No.: US 6,935,224 B2
(45) Date of Patent: Aug. 30, 2005

(54) BREAD MAKER AND CONTROL METHOD THEREOF

(75) Inventors: Jang-woo Lee, Suwon (KR); Yong-hyun Kwon, Suwon (KR); Dong-bin Lim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/382,651

(22) Filed: Mar. 7, 2003

(65) Prior Publication Data

US 2004/0011212 A1 Jan. 22, 2004

(30) Foreign Application Priority Data

Jul. 19, 2002 (KR) .......................................... 2002-42592

(51) Int. Cl.[7] .................................................. A21B 1/00
(52) U.S. Cl. ........................... 99/334; 99/344; 99/348; 99/352; 366/146; 366/240
(58) Field of Search ...................... 99/325, 334, 337, 99/342, 344, 348, 349, 352, 468, 486; 366/98, 144–146, 219, 240; 426/231–233

(56) References Cited

U.S. PATENT DOCUMENTS

| | | |
|---|---|---|
| 3,839,628 A | 10/1974 | Higgins et al. |
| 3,841,147 A | 10/1974 | Coil et al. |
| 4,311,397 A | 1/1982 | Wright |
| 4,747,690 A | 5/1988 | Hayashi |
| 4,803,086 A | 2/1989 | Hedenberg |
| 4,836,683 A | 6/1989 | Aoyama |
| 4,953,984 A | 9/1990 | Miyoshi |
| 4,984,512 A | 1/1991 | Takahashi et al. |
| 5,019,972 A | 5/1991 | Rim |
| 5,145,252 A | 9/1992 | Oh |
| 5,146,840 A | 9/1992 | Hedenberg |
| 5,510,127 A * | 4/1996 | Wong et al. ................... 426/19 |
| 5,556,198 A | 9/1996 | Dickson, Jr. et al. |
| 5,921,367 A | 7/1999 | Kashioka et al. |
| 5,934,177 A | 8/1999 | Takeda et al. |
| 5,947,009 A | 9/1999 | Hedenberg |
| 6,058,831 A * | 5/2000 | Nakano et al. ................ 99/348 |
| 6,401,599 B1 * | 6/2002 | Maeda et al. .................. 99/327 |

FOREIGN PATENT DOCUMENTS

| | | |
|---|---|---|
| JP | 2-55020 | 2/1990 |
| JP | 3-4820 | 1/1991 |
| KR | 1991-10203 | 4/1988 |
| KR | 1989-22340 | 12/1989 |
| KR | 1991-4792 | 3/1991 |
| KR | 1991-4687 | 5/1991 |
| KR | 1991-4687 | 7/1991 |
| KR | 1992-4671 | 7/1991 |
| KR | 1992-823 | 1/1992 |

(Continued)

OTHER PUBLICATIONS

U.S. Appl. No. 10/318,221, filed Dec. 13, 2002, Kwon.
U.S. Appl. No. 10/390,012, filed Mar. 18, 2003, Kwon.
U.S. Appl. No. 10/391,814, filed Mar. 20, 2003, Kwon.
U.S. Appl. No. 10/391,772, filed Mar. 20, 2003, Kwon.

*Primary Examiner*—Drew Becker
(74) *Attorney, Agent, or Firm*—Staas & Halsey LLP

(57) ABSTRACT

A bread maker including a main body divided into an oven compartment and an electric component compartment; a pair of parallel kneading drums spaced apart from each other inside the oven compartment, each kneading drum having a holding part holding opposite ends of a mixing bag containing ingredients for bread, and reversing rotary direction periodically; a drum driving part in the electric component compartment rotating the kneading drums in clockwise and counterclockwise directions; a kneading drum control part allowing a user to control rotation of the kneading drums as desired; and a controller controlling the drum driving part to rotate the kneading drums according to user control of the kneading drum control part.

15 Claims, 6 Drawing Sheets

FOREIGN PATENT DOCUMENTS

| | | |
|---|---|---|
| KR | 92-1838 | 2/1992 |
| KR | 1992-1838 | 2/1992 |
| KR | 1992-4671 | 7/1992 |
| KR | 1998-25411 | 7/1998 |
| KR | 1999-16567 | 3/1999 |
| KR | 20-220095 | 1/2001 |
| KR | 10-336514 | 5/2002 |
| WO | 87/03784 | 7/1987 |
| WO | 99/25467 | 5/1999 |

* cited by examiner

BREAD MAKER AND CONTROL METHOD THEREOF

CROSS-REFERENCE TO RELATED APPLICATIONS

This application claims the benefit of Korean Application No. 2002-42592, filed Jul. 19, 2002, in the Korean Intellectual Property Office, the disclosure of which is incorporated herein by reference.

BACKGROUND OF THE INVENTION

1. Field of the Invention

The present invention relates to a bread maker and a method of controlling the bread maker.

2. Description of the Related Art

Generally, making bread is so complicated that it is difficult for an average person to manually make satisfactory bread at home. That is, making the bread includes multiple steps of mixing raw materials (ingredients) such as flour, sugar, yeast, etc., to form a dough; kneading the dough; leavening the dough; baking the dough; and so on.

Therefore, various bread makers have been developed to allow a user to easily make bread. The bread maker automatically performs the foregoing multiple steps and provides finished bread to the user.

For example, a bread maker disclosed in Korean Patent Publication No.1991-10203 includes a pair of parallel kneading drums at upper and lower parts of an oven compartment that reverse rotary direction periodically, a baking tray between the pair of kneading drums, a heater heating the inside of the oven compartment, a bar code scanner, etc.

In the bread maker, disclosed in Korean Patent Publication No. 1991-10203, upper and lower ends of a mixing bag filled with flour, water, etc., are attached to the upper and lower kneading drums, and then the mixing bag is reciprocated up and down for a predetermined period of time, thereby kneading the dough in the mixing bag.

After completing the kneading of the dough, the mixing bag is automatically separated from the upper kneading drum, and wound on the lower kneading drum, with the dough being squeezed out of the mixing bag and into the baking tray. Thereafter, a heater heats the inside of the oven compartment, thereby leavening and baking the dough for a predetermined period of time.

The bread is made according to a bar code that is printed on the mixing bag that includes information on kneading time, leavening time, baking time, etc., for a particular recipe. That is, the bar code is read by the bar code scanner and the read data are transmitted to a controller, so that the controller controls the kneading drums, the heater, etc., on the basis of the read data.

However, while the mixing bag is being reciprocated up and down to knead the dough, if a problem arises during the kneading operation, (e.g., the mixing bag tears or separates from one of the upper and lower kneading drums) a user must stop operation of the upper and lower kneading drums and remove the mixing bag from the upper and lower kneading drums. However, in the conventional bread maker, it is difficult to remove the mixing bag from the upper and lower kneading drums when operation of the upper and lower kneading drums is stopped.

SUMMARY OF THE INVENTION

It is an aspect of the present invention to provide a bread maker and a control method thereof, in which a user can rotate the kneading drums stepwise as desired, so that the user can easily and safely remove a mixing bag from the kneading drums when a problem occurs during the kneading operation.

Additional aspects and advantages of the invention will be set forth in part in the description that follows, and, in part, will be obvious from the description, or may be learned by practice of the invention.

To achieve the above and/or other aspects according to an embodiment of the present invention, there is provided a bread maker including a main body divided into an oven compartment and an electric component compartment; a pair of parallel kneading drums spaced apart from each other inside the oven compartment, each kneading drum having a holding part holding opposite ends of a mixing bag containing ingredients for bread, and reversing rotary direction periodically; a drum driving part in the electric component compartment rotating the kneading drums in clockwise and counterclockwise directions; a kneading drum control part allowing a user to control rotation of the kneading drums as desired; and a controller controlling the drum driving part to rotate the kneading drums according to user control of the kneading drum control part.

The kneading drum control part includes a user mode button to stop operation of the kneading drums, which hold the mixing bag to allow the user to remove the mixing bag.

The kneading drum control part includes a drum rotating button to rotate the kneading drums in a desired direction and angle to unwind the mixing bag from the kneading drums.

The kneading drum control part includes a drum reset button to reset the kneading drums in an initial state in which the opposite ends of the mixing bag are attached to the kneading drums, and the controller controls the drum driving part to place the kneading drums in the initial state when the drum reset button is pushed.

The bread maker further includes a disk part rotating with one of the kneading drums, and having at least one projection radially extending from a circumference thereof; and a rotation sensing part sensing rotation of the at least one projection of the disk part and outputting pulse signals according to the sensed rotation, wherein the controller controls a rotation rate of the one of the kneading drums based upon the pulse signals output from the rotation sensing part.

The rotation sensing part is a pulse generator comprising a light emitting part and a light receiving part facing each other with the disk part therebetween.

The disk part includes a first disk having a single projection; and a second disk having a plurality of projections along a circumference thereof at regular intervals.

The controller rotates the disk part to make the rotation sensing part sense the projections of the first disk and the second disk according to selection of the kneading drum control part, and stops rotation of the kneading drums and displays an error message when the rotation sensing part does not output any pulse signals within a predetermined allowable time after selection of the kneading drum control part.

To achieve the above and/or other aspects according to the present invention, there is provided a method of controlling a bread maker having a main body divided into an oven compartment and an electric component compartment, a pair of parallel kneading drums spaced apart from each other inside the oven compartment to which are attached opposite ends of a mixing bag containing ingredients for bread, the kneading drums reversing rotary direction periodically, and a drum driving part in the electric component compartment rotating the kneading drums, the method including stopping operation of the kneading drums, which hold the mixing bag; allowing a user to adjust a rotating direction and a rotating angle of the kneading drums; rotating the kneading drums according to the adjusted rotating direction and angle; and removing the mixing bag from the kneading drums.

The method further includes resetting the kneading drums in an initial state, in which the opposite ends of the mixing bag are attached to the kneading drums, after removing the mixing bag.

The bread maker includes a disk part rotating with one of the kneading drums, and having at least one projection radially extending from a circumference thereof; and a rotation sensing part sensing rotation of the at least one projection of the disk part and outputting pulse signals according to the sensed rotation, and wherein the adjusted rotation direction and rotation angle of the kneading drums are controlled based upon the pulse signals.

The rotation sensing part is a pulse generator comprising a light emitting part and a light receiving part facing each other with the disk part therebetween.

The bread maker includes a kneading drum control part to rotate the kneading drums in a desired direction and angle, and wherein said allowing the user to adjust the rotation direction and the rotation angle of the kneading drums comprises allowing the kneading drums to rotate while the rotation sensing part senses the at least one projection of the disk part each time the kneading drum control part is selected.

The method further includes stopping rotation of the kneading drums and displaying an error message when the rotation sensing part does not output any pulse signals within a predetermined allowable time after selection of the kneading drum control part.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other aspects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
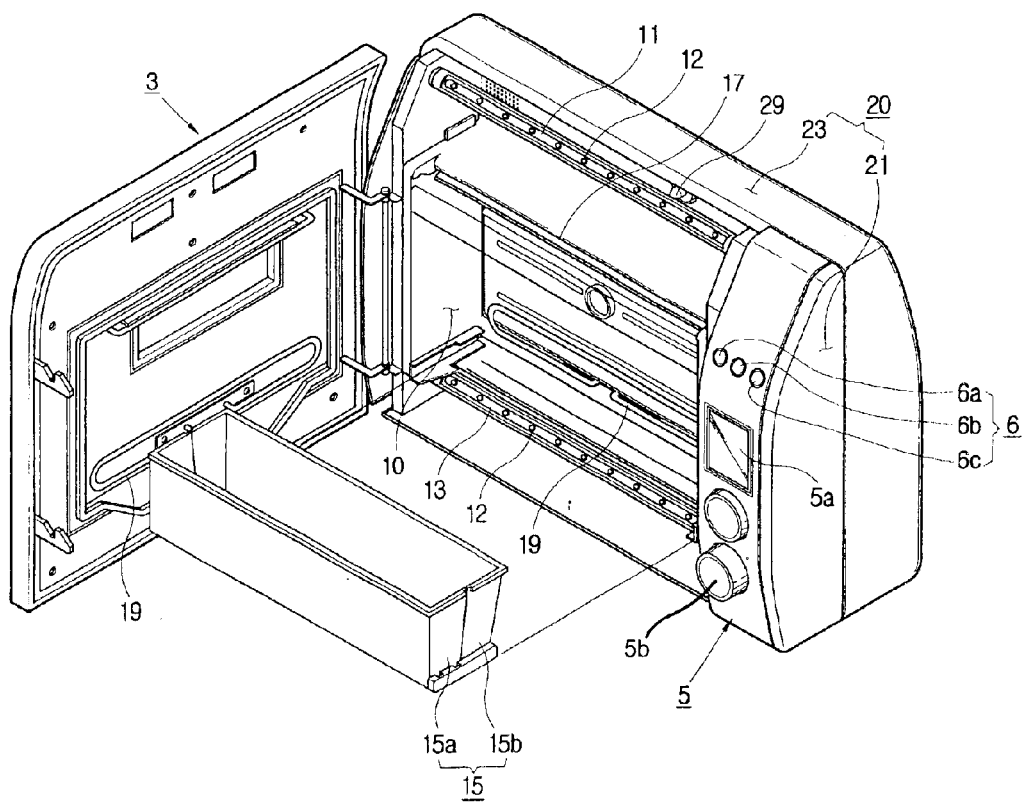
FIG. 1 is a perspective view of a bread maker according to an embodiment of the present invention.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
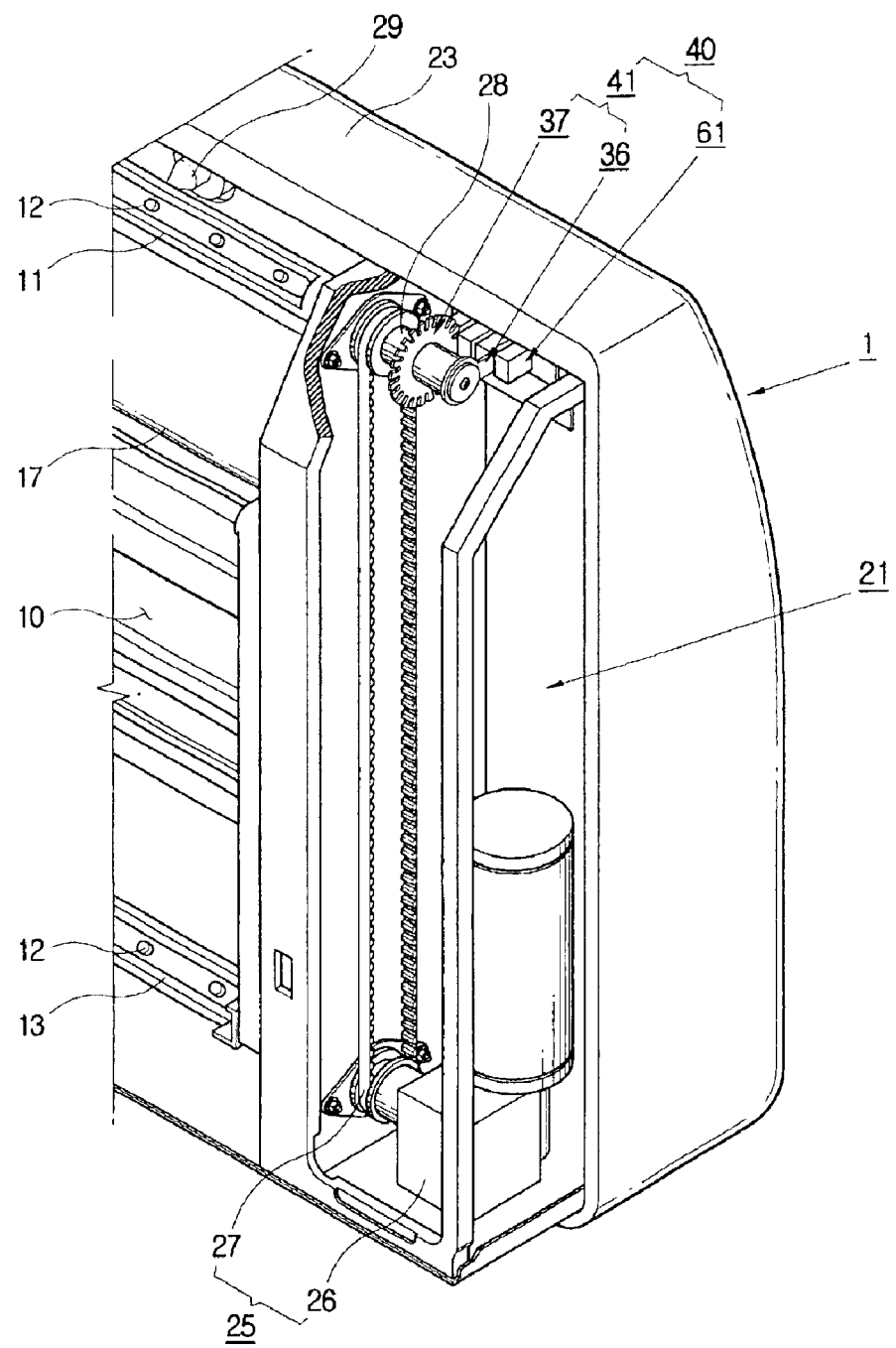
FIG. 2 is a perspective view of an electric component compartment of the bread maker shown in FIG. 1.
Figure 3:
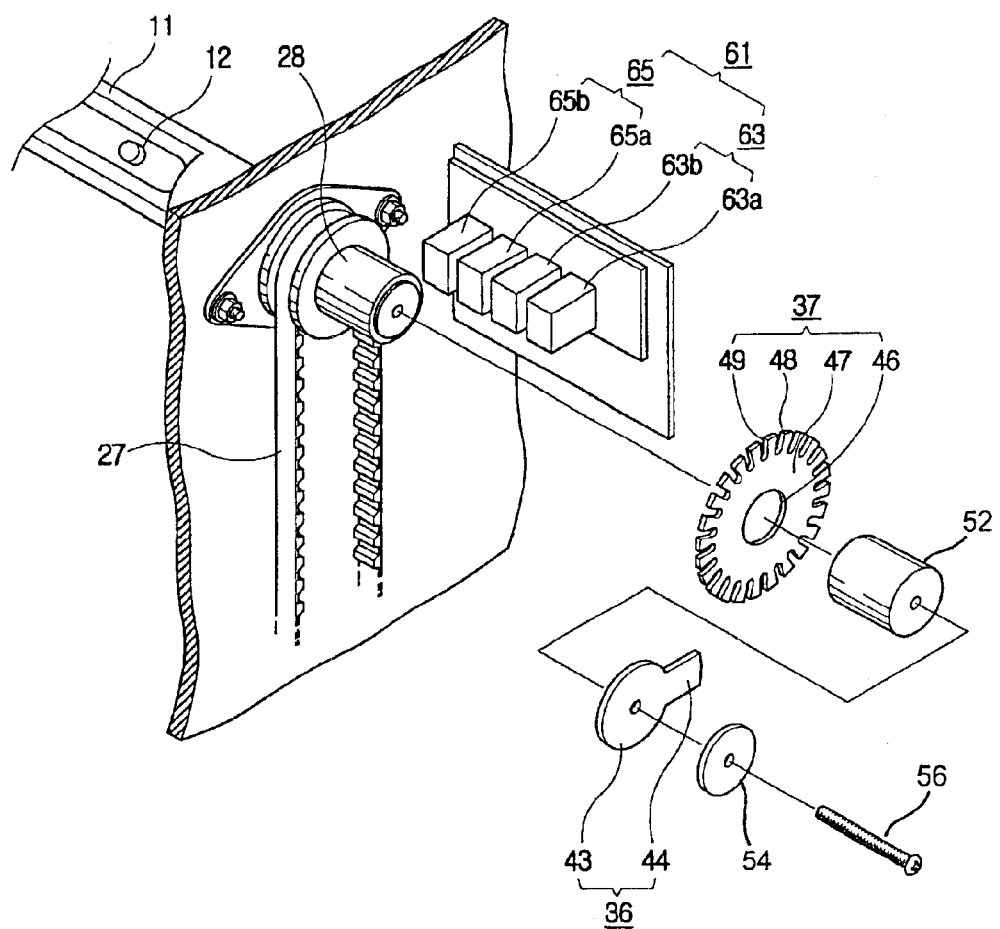
FIG. 3 is an exploded perspective view of a rotation sensing part of the bread maker shown in FIG. 2.

As shown in FIGS. 1 through 3, a bread maker according to an embodiment of the present invention includes a main body 1 divided into an oven compartment 10 and an electric component compartment 20, a door 3 in the front of the main body 1 to open and close the front opening of the oven compartment 10, and a control panel 5 in the front of the main body 1. The control panel 5 includes a rotatable knob 5b, for example, which a user uses to control operation of the bread maker, a display panel 5a displaying an operating state of the bread maker, and a kneading drum control part 6 allowing the user to control upper and lower kneading drums 11 and 13 (described below).

The kneading drum control part 6 includes a user mode button 6a to stop the upper and lower kneading drums 11 and 13 from operating and allow the user to select a mixing bag removal mode when the kneading operation does not operate properly, a drum rotating button 6b to rotate the upper and lower kneading drums 11 and 13 stepwise in a desired rotation direction and angle, and a drum reset button 6c to reset the upper and lower kneading drums 11 and 13 after removing a mixing bag 7.

Figure 4:
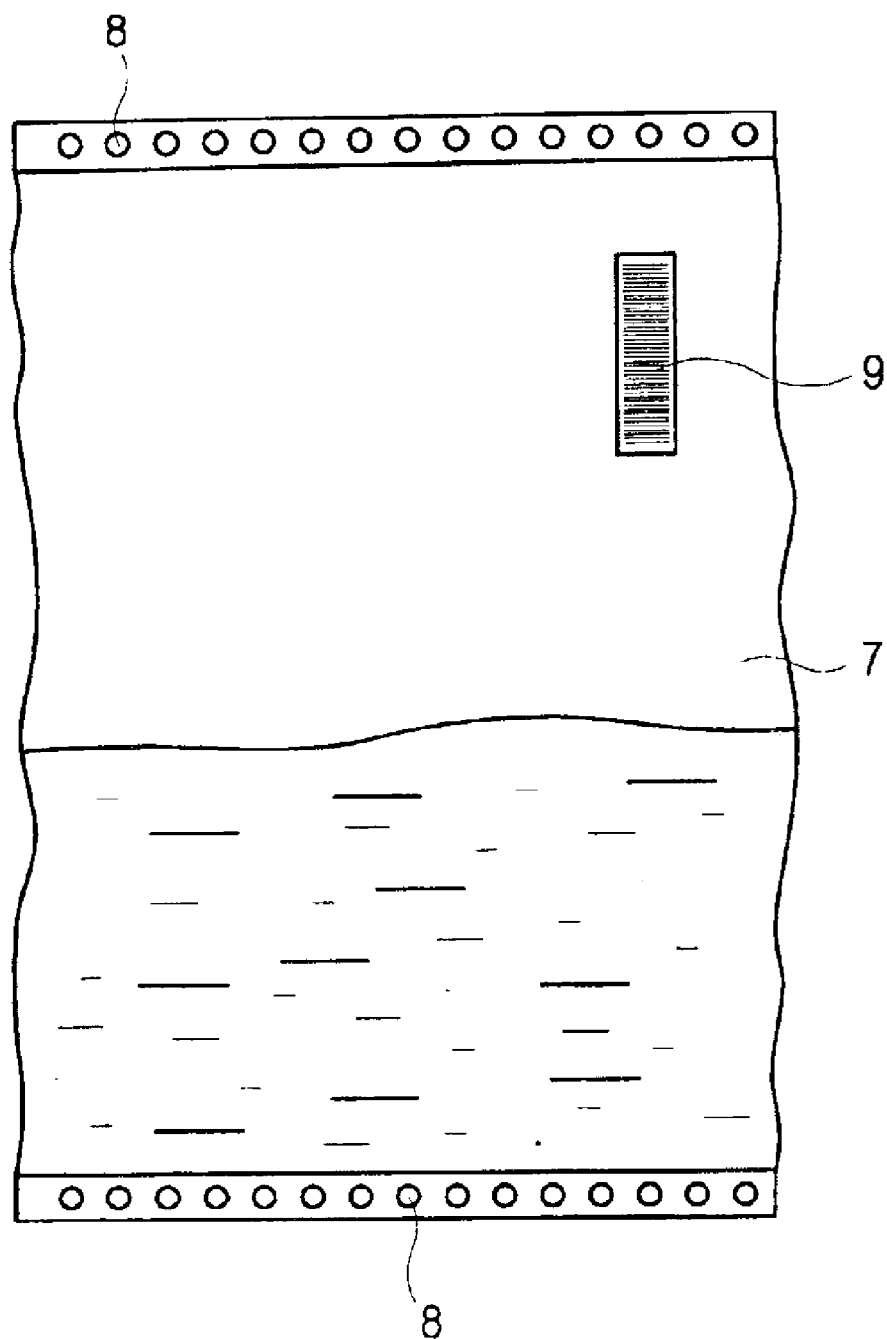
FIG. 4 is a front view of a mixing bag used in the bread maker according to the embodiment of the present invention.

Inside the oven compartment 10, the upper and lower kneading drums 11 and 13 are provided in parallel and rotate in clockwise and counterclockwise directions. Opposite ends 8 of the mixing bag 7 (refer to FIG. 4) filled with raw materials (ingredients) for bread are attached to projections 12 on the upper and lower kneading drums 11 and 13, and the mixing bag 7 is wound on the upper and lower kneading drums 11 and 13.

In a lower part of the oven compartment 10, there is a baking tray 15 in which the kneaded dough is baked between the upper and lower kneading drums 11 and 13. The baking tray 15 includes first and second trays 15a and 15b, each having an "L"-shaped section symmetrical to one another that combine into a box shape having an open top. In an upper part of the oven compartment 10, a pair of squeezing members 17 is between the upper kneading drum 11 and the baking tray 15 to knead the dough contained in the mixing bag 7 within the baking tray 15, preventing the dough from moving outside the baking tray 15.

At upper and lower parts of the inside walls of the oven compartment 10 and the door 3 are heaters 19 for heating the inside of the oven compartment 10.

The electric component compartment 20 includes a first component compartment 21 placed beside the oven compartment 10 and a second component compartment 23 placed behind the oven compartment 10. Inside the first component compartment 21 is a drum driving part 25 that rotates the upper and lower kneading drums 11 and 13 in clockwise and counterclockwise directions. Inside the second component compartment 23 is a bar code scanner 29 that reads a bar code 9 printed on or applied to the mixing bag 7 that is wound on the upper and lower kneading drums 11 and 13. The bar code scanner 29 may move near to, and distantly from, an outer circumference of the upper kneading drum 11.

The drum driving part 25 includes a motor 26 that rotates the lower kneading drum 13, and a belt 27 that transmits a rotary movement of the lower kneading drum 13 to a rotation shaft 28 of the upper kneading drum 11.

A rotation sensing part 40 senses rotation of at least one of the upper and lower kneading drums 11 and 13 and outputs pulse signals corresponding to the sensed rotation. A controller 70 (described below) controls the upper and lower kneading drums 11 and 13 according to the pulse signals output from the rotation sensing part 40.

The rotation sensing part 40 includes a disk part 41 attached to the rotation shaft 28 of the upper kneading drum 11, and a rotation sensor 61 placed near the disk part 41 that outputs a pulse signal by sensing the rotation of the disk part 41.

The disk part 41 includes a first disk 36 that allows the rotation sensor 61 to sense one revolution of the upper kneading drum 11, and a second disk 37 that allows the rotation sensor 61 to sense a rotation of the upper kneading drum that is less than one complete turn.

The first disk 36 is a circular plate 43, which is separated from the second disk 37 by a cylindrical part 52 and connected to the rotation shaft 28 of the upper kneading drum 11 using a washer 54 and a bolt 56. The circular plate 43 is formed with a single projection 44 radially extended therefrom. Hence, the first disk 36 rotates with the upper kneading drum 11 and allows the rotation sensor 61 to sense one revolution of the upper kneading drum 11.

The second disk 37 is a circular plate 47 with a shaft combining hole 46 used to attach the circular plate 47 to the rotation shaft 28 of the upper kneading drum 11. The circular plate 47 has a plurality of slots 49 along the circumference thereof at regular intervals, forming a plurality of projections 48. For example, in the embodiment shown in FIG. 3, the second disk 37 has twenty-four slots 49, forming twenty-four projections 48. Hence, the second disk 37 rotates with the upper kneading drum 11 and allows the rotation sensor 61 to sense a rotation of the upper kneading drum 11 that is less than one revolution.

The rotation sensor 61 includes a first disk sensor 63 sensing the single projection 44 of the first disk 36 and outputting one pulse signal per revolution of the upper kneading drum 11, and a second disk sensor 65 sensing the twenty-four projections 48 of the second disk 37 and outputting twenty-four pulse signals per revolution of the upper kneading drum 11. That is, while the upper kneading drum 11 makes one revolution, the first and second disk sensors 63 and 65 output one and twenty-four pulse signals, respectively.

The first and second disk sensors 63 and 65 are each used as a pulse generator, and include light emitting parts 63*a* and 65*a* that emit a sensing signal such as infrared rays toward the first and second disks 36 and 37, and light receiving parts 63*b* and 65*b* that face the light emitting parts 63*a* and 65*a*, respectively, across the first and second disks 36 and 37 and receive the light emitted from the light emitting parts 63*a* and 65*a*, respectively.

The first disk sensor 63 senses when the single projection 44 of the first disk 36 interrupts the light emitted from the light emitting part 63*a* to the light receiving part 63*b*, thereby outputting one pulse signal per one complete turn of the upper kneading drum 11.

The second disk sensor 65 senses when the twenty-four projections 48 of the second disk 37 interrupt the light emitted from the light emitting part 65*a* to the light receiving part 65*b*, thereby outputting twenty-four pulse signals per revolution of the upper kneading drum 11.

The rotation sensor 61 transmits the pulse signals output from the first and second disk sensors 63 and 65 to the controller 70, and the controller 70 determines a rotation rate of the upper kneading drum 11 based upon the output pulse signals. Thus, the controller 70 controls the motor 26 of the drum driving part 25 to rotate the upper and lower kneading drums 11 and 13 according to the determined rotation rate thereof, thereby causing the mixing bag 7 to be properly reciprocated up and down.

Figure 5:
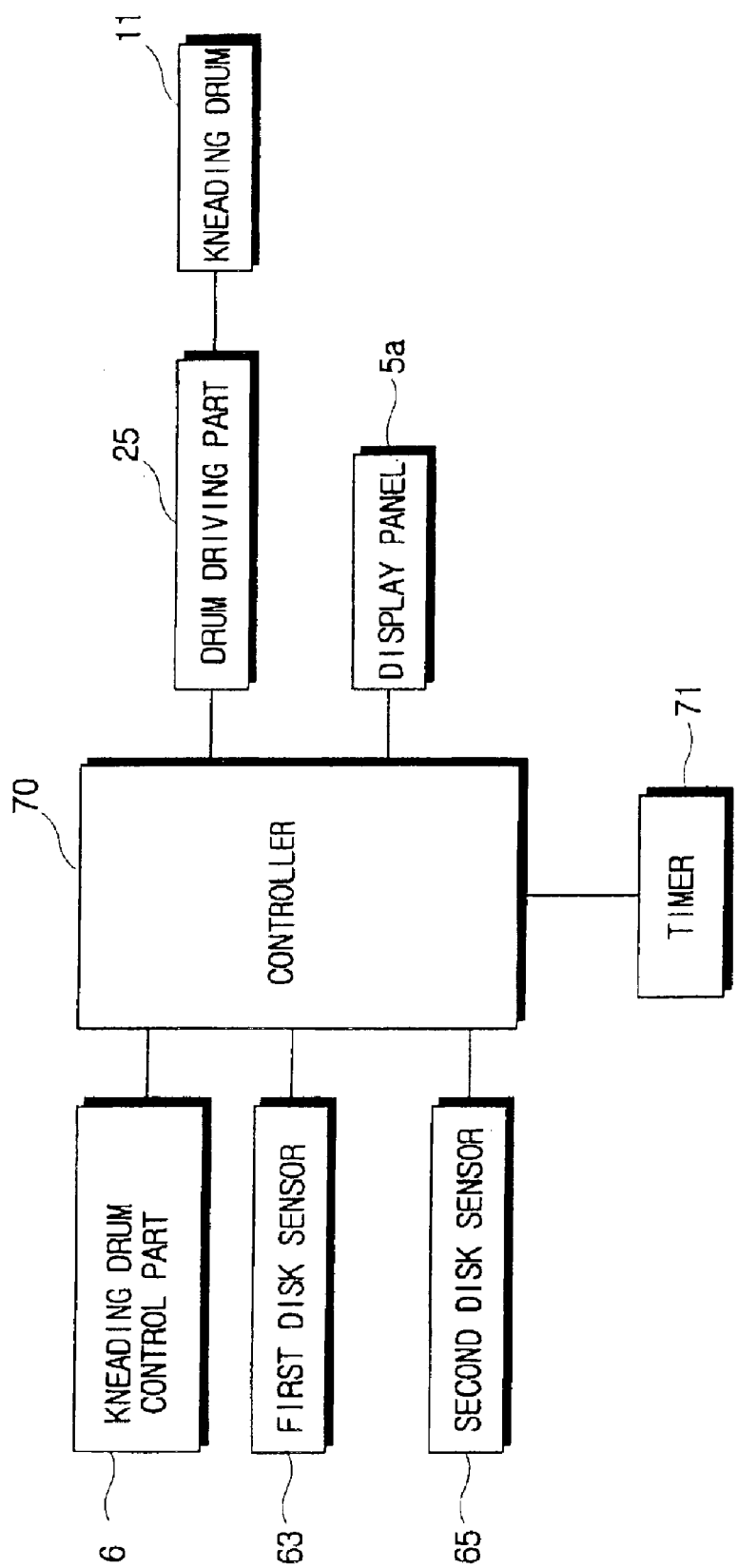
FIG. 5 is a control block diagram of the bread maker according to the embodiment of the present invention.

Thus, as shown in FIG. 5, the bread maker according to the embodiment of the present invention includes the kneading drum control part 6 with the user mode button 6*a*, the drum rotating button 6*b*, and the drum reset button 6*c*, and the controller 70 controlling the drum driving part 25 to rotate the upper and lower kneading drums 11 and 13 according to selection of the respective buttons of the kneading drum control part 6.

The drum rotating button 6*b* is used to select the rotating direction of the upper and lower kneading drums 11 and 13. For example, the drum rotating button 6*b* may be divided into a clockwise rotating selection part and a counterclockwise rotating selection part. Each time the drum rotating button 6*b* is pushed, the upper and lower kneading drums 11 and 13 rotate simultaneously in the same direction at a predetermined angle.

The controller 70 determines and controls the rotation rate of the upper kneading drum 11 based upon the pulse signal output from the first and second disk sensors 63 and 65 and time measured by a timer 71 described below. The controller 70 controls rotation of both the upper and lower kneading drums 11 and 13 at predetermined angles, (e.g., at an angle of 30°) each time the drum rotating button 6*b* is pushed. Hence, the user can rotate the upper and lower kneading drums 11 and 13 in a stepwise manner. In other words, the mixing bag 7 can be unwound from the upper and lower kneading drums 11 and 13 by repeatedly pushing the drum rotating button 6*b*. Thus, the user can easily and safely remove the mixing bag 7 from the upper and lower kneading drums 11 and 13.

After the drum rotating button 6*b* is pushed, the timer 71 begins measuring time and if no pulse signal is generated within a predetermined allowable time, the controller 70 determines that the mixing bag 7 or extraneous matter is entangled in the upper or lower kneading drum 11 or 13, and displays an error message on the display panel 5*a*.

For safety reasons, the controller 70 controls the upper and lower kneading drums 11 and 13 to rotate more slowly when the drum rotating button 6*b* is pushed than when the upper and lower kneading drums 11 and 13 rotate to knead the dough.

After removing the mixing bag 7, when the drum reset button 6*c* is pushed, the controller 70 rotates the upper and lower kneading drums 11 and 13 to an initial position at which the opposite ends 8 of the mixing bag 7 may be attached.

Figure 6:
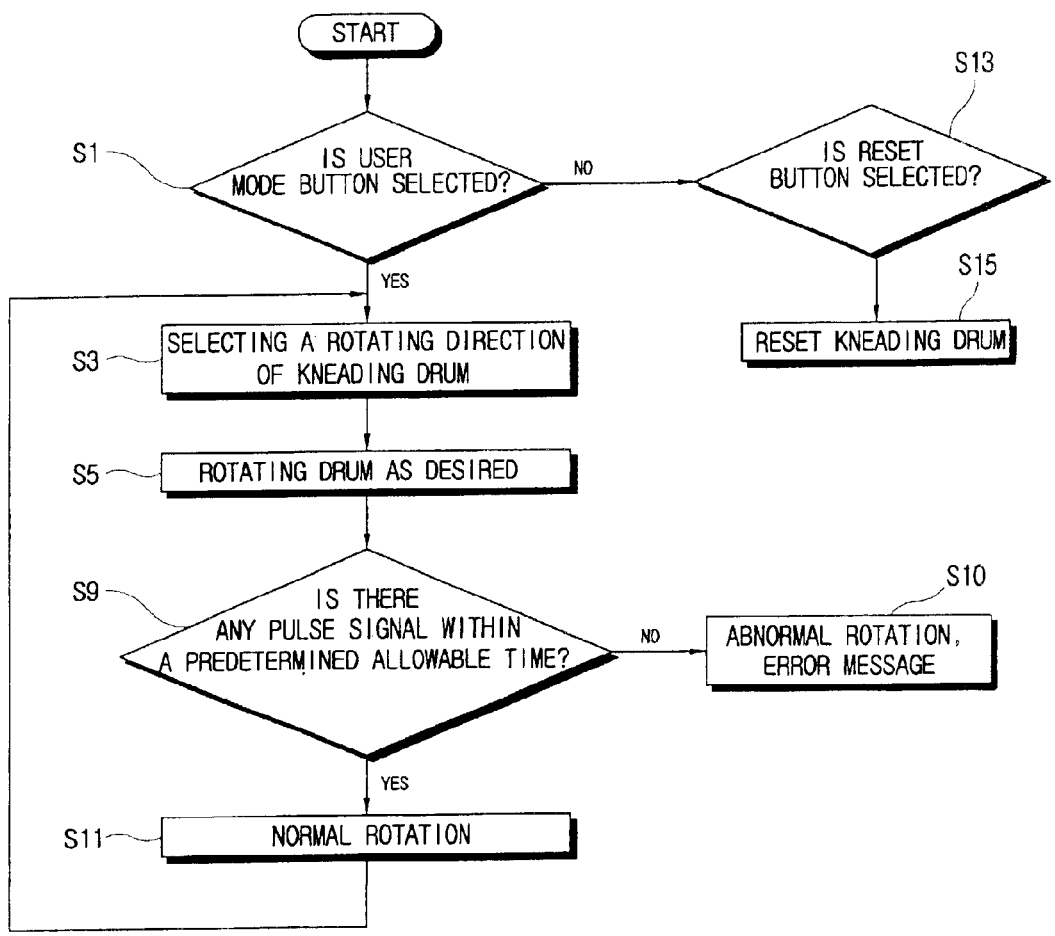
FIG. 6 is a control flowchart of the bread maker according to the embodiment of the present invention.

Thus, when the kneading operation does not operate properly, the bread maker according to the embodiment of the present invention is controlled as follows. Referring to FIG. 6, first, the user mode button 6*a* is pushed to stop the upper and lower kneading drums 11 and 13 from operating (S1). Thereafter, the drum rotating button 6*b* is pushed to select the rotating direction and the rotating angle of the upper and lower kneading drums 11 and 13 to unwind the mixing bag 7 from the upper and lower kneading drums 11 and 13 (S3). As the drum rotating button 6*b* is repeatedly pushed, the upper and lower kneading drums 11 and 13 rotate in the selected rotating direction at a predetermined angle per push of the drum rotating button 6*b* (S5). Simultaneously, the controller 70 determines whether pulse signals are output from the second disk sensor 65 within the predetermined allowable time, based upon time measured by the timer 71 (S9). If a pulse signal is generated within the predetermined allowable time, the controller 70 determines that the upper and lower kneading drums 11 and 13 are rotating normally, and controls the upper and lower kneading drums 11 and 13 to rotate stepwise each time the drum rotating button 6b is pushed (S11). However, if no pulse signal is generated within the predetermined allowable time, the controller 70 determines that the mixing bag 7 or extraneous matter is entangled in the upper or lower kneading drum 11 or 13, and displays an error message on the display panel 5a (S10).

As the upper and lower kneading drums 11 and 13 are stepwise rotated to unwind the mixing bag 7 therefrom, a user can easily and safely remove the mixing bag 7 from the upper and lower kneading drums 11 and 13. After removing the mixing bag 7, when the drum reset button 6c is pushed (S13), the controller 70 rotates the upper and lower kneading drums 11 and 13 to place the projections 12 at an initial position at which the opposite ends 8 of the mixing bag 7 may be attached to the projections 12 (S15).

According to the embodiment of the present invention, when a problem occurs during the kneading operation, a user can stop the kneading drums 11 and 13 and stepwise rotate the kneading drums 11 and 13 as desired to easily and safely removing the mixing bag 7 from the kneading drums 11 and 13. After removing the mixing bag 7, the kneading drums 11 and 13 are automatically reset for easy attachment of the mixing bag 7.

As described above, the embodiment of the present invention provides a bread maker and a control method thereof, in which a user can rotate kneading drums stepwise as desired, so that a user can easily and safely remove a mixing bag from the kneading drums when the kneading operation malfunctions.

Although an embodiment of the present invention has been shown and described, it will be appreciated by those skilled in the art that changes may be made in these embodiments without departing from the principles and spirit of the invention, the scope of which is defined in the appended claims and their equivalents.

What is claimed is:

1. A bread maker comprising:
a main body divided into an oven compartment and an electric component compartment;
a pair of parallel kneading drums spaced apart from each other inside the oven compartment, each kneading drum having a holding part holding opposite ends of a mixing bag containing ingredients, and reversing rotary direction periodically;
a drum driving part in the electric component compartment rotating the kneading drums in clockwise and counterclockwise directions;
a kneading drum control part allowing a user to control rotation of the kneading drums in a desired direction and angle to unwind the mixing bag from the kneading drums; and
a controller controlling the drum driving part to rotate the kneading drums according to user control of the kneading drum control part.

2. The bread maker according to claim 1, wherein the kneading drum control part comprises a user mode button to stop operation of the kneading drums, which hold the mixing bag to allow the user to remove the mixing bag.

3. The bread maker according to claim 2, wherein the kneading drum control part comprises a drum rotating button to rotate the kneading drums in the desired direction and angle to unwind the mixing bag from the kneading drums.

4. The bread maker according to claim 3, wherein as the user repeatedly pushes the drum rotating button, the kneading drums rotate in the desired direction at a predetermined rotation angle with each push of the drum rotation button.

5. The bread maker according to claim 3, wherein the kneading drum control part comprises a drum reset button to reset the kneading drums in an initial state in which the opposite ends of the mixing bag are attached to the kneading drums, and the controller controls the drum driving part to be place the kneading drums in the initial state when the drum reset button is pushed.

6. The bread maker according to claim 5, further comprising:
a disk part rotating with one of the kneading drums, and having at least one projection radially extending from a circumference thereof; and
a rotation sensing part sensing rotation of the at least one projection of the disk part and outputting pulse signals according to the sensed rotation,
wherein the controller controls a rotation rate of the one of the kneading drums based upon the pulse signals output from the rotation sensing part.

7. The bread maker according to claim 6, wherein the rotation sensing part is a pulse generator comprising a light emitting part and a light receiving part facing each other with the disk part therebetween.

8. The bread maker according to claim 7, wherein the disk part comprises:
a first disk having a single projection; and
a second disk having a plurality of projections along a circumference thereof at regular intervals.

9. The bread maker according to claim 8, wherein the controller rotates the disk part to make the rotation sensing part sense the projections of the first disk and the second disk according to selection of the kneading drum control part, and stops rotation of the kneading drums and displays an error message when the rotation sensing part does not output any pulse signals within a predetermined allowable time after selection of the kneading drum control part.

10. The bread maker according to claim 8, wherein if the pulse signals are generated within the predetermined allowable time, the controller determines that the kneading drums are rotating normally and controls the kneading drums to rotate stepwise with each push of the drum rotating button.

11. The bread maker according to claim 8, wherein the rotation sensing part senses one revolution of the one of the kneading drums using the first disk, and the disk sensor senses rotation of the one of the kneading drums that is less than one revolution using the second disk.

12. The bread maker according to claim 8, wherein the rotation sensing part outputs one pulse signal per revolution of the one of the kneading drums, and outputs a number of pulse signals per revolution of the one of the kneading drums equal to the number of projections on the second disk.

13. The bread maker according to claim 8, wherein the kneading drums comprise an upper kneading drum and a lower kneading drum.

14. The bread maker according to claim 13, wherein the drum driving part comprises a motor to rotate the lower kneading drum and a belt connecting the lower kneading drum to the upper kneading drum, the belt transmitting a rotary movement of the lower kneading drum to the upper kneading drum.

15. The bread maker according to claim 14, wherein the controller determines a rotation rate of the upper kneading drum using the output pulse signals and controls the motor to rotate the upper kneading drum and the lower kneading drum according to the determined rotation rate.

* * * * *